No. 713,104. Patented Nov. 11, 1902.
E. V. JOHNSON.
FIREPROOF GRAIN BIN.
(Application filed June 14, 1902.)
(No Model.) 4 Sheets—Sheet 1.
Fig. 1.
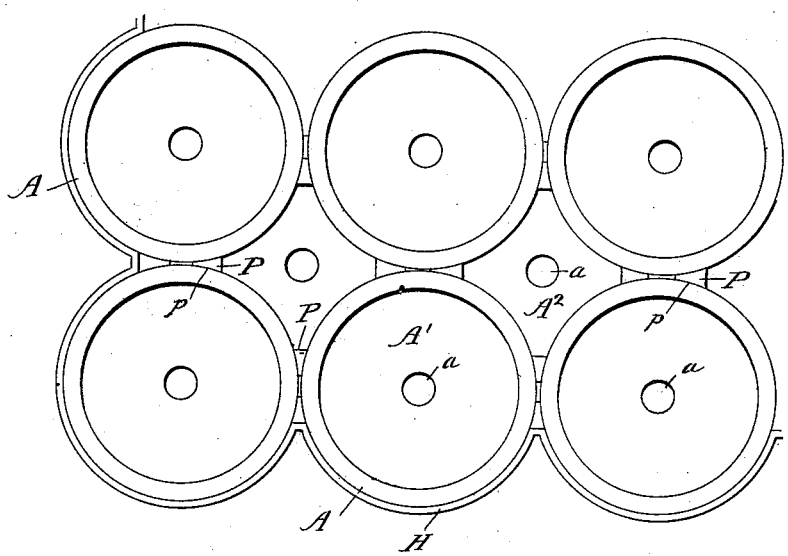
Fig. 2.
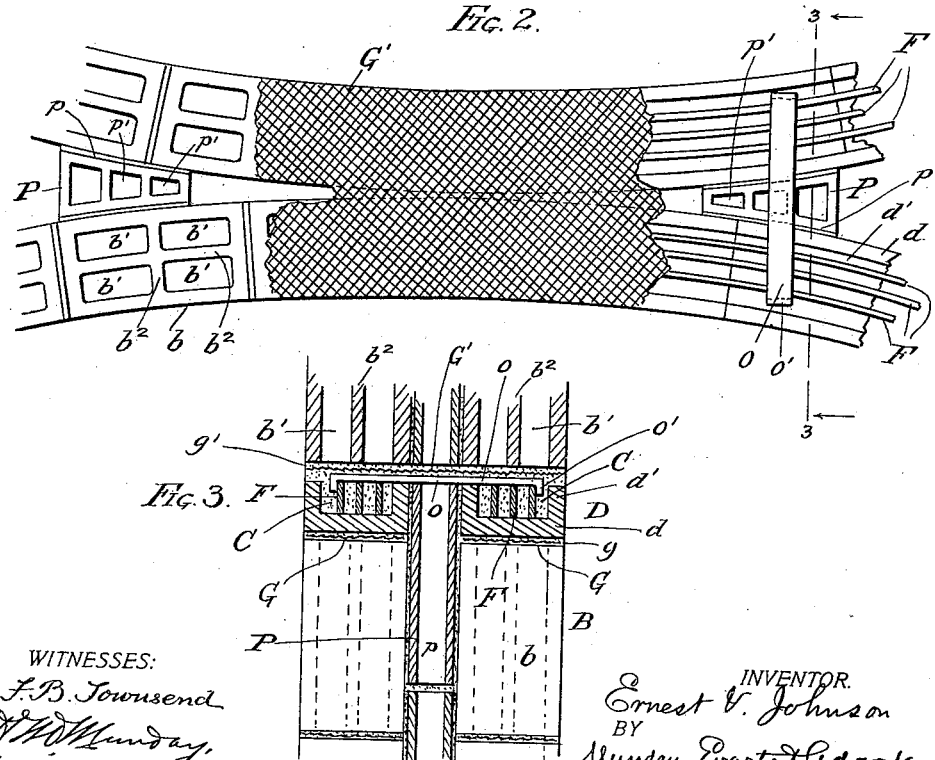
Fig. 3.
WITNESSES:
F. B. Townsend
N. W. Munday
INVENTOR.
Ernest V. Johnson
BY
Munday, Evarts & Adcock
ATTORNEYS No. 713,104. Patented Nov. 11, 1902.
E. V. JOHNSON.
FIREPROOF GRAIN BIN.
(Application filed June 14, 1902.)
(No Model.) 4 Sheets—Sheet 2.
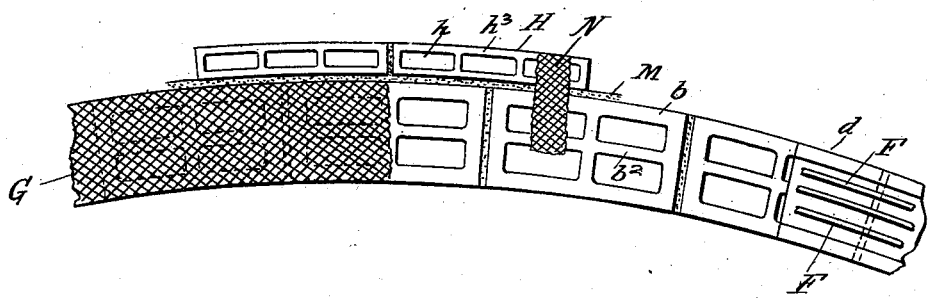
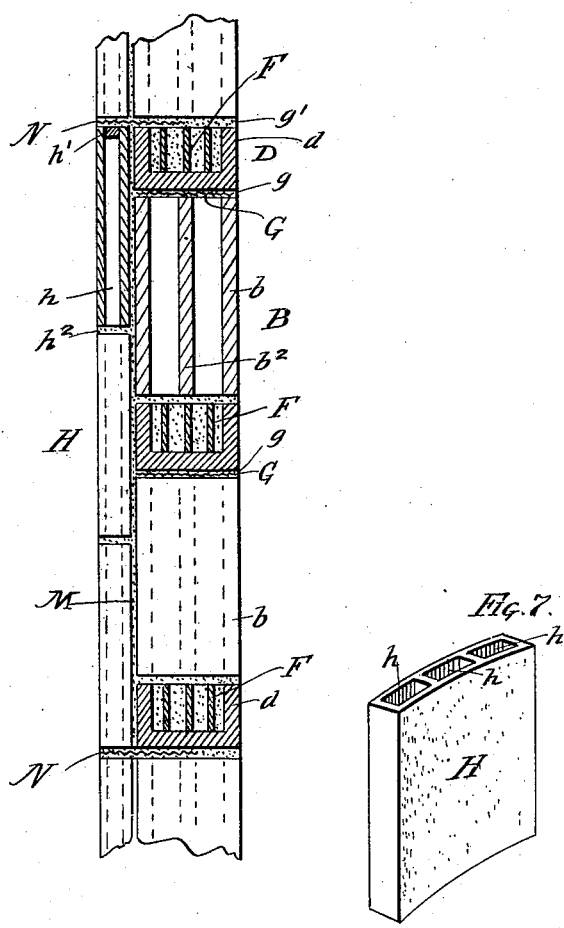
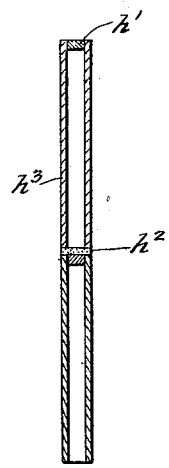
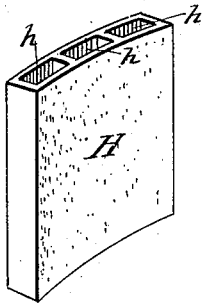
WITNESSES: INVENTOR.
Ernest V. Johnson.
BY
Munday, Evarts & Adcock
ATTORNEYS No. 713,104. Patented Nov. 11, 1902.
E. V. JOHNSON.
FIREPROOF GRAIN BIN.
(Application filed June 14, 1902.)

(No Model.) 4 Sheets—Sheet 3.

WITNESSES:
F. B. Townsend
H. W. Munday

INVENTOR.
Ernest V. Johnson.
BY
Munday, Evarts & Adcock
ATTORNEYS

THE NORRIS PETERS CO., PHOTO-LITHO., WASHINGTON, D. C.

No. 713,104.  
E. V. JOHNSON.  
FIREPROOF GRAIN BIN.  
(Application filed June 14, 1902.)  
Patented Nov. 11, 1902.  
(No Model.)  
4 Sheets—Sheet 4.
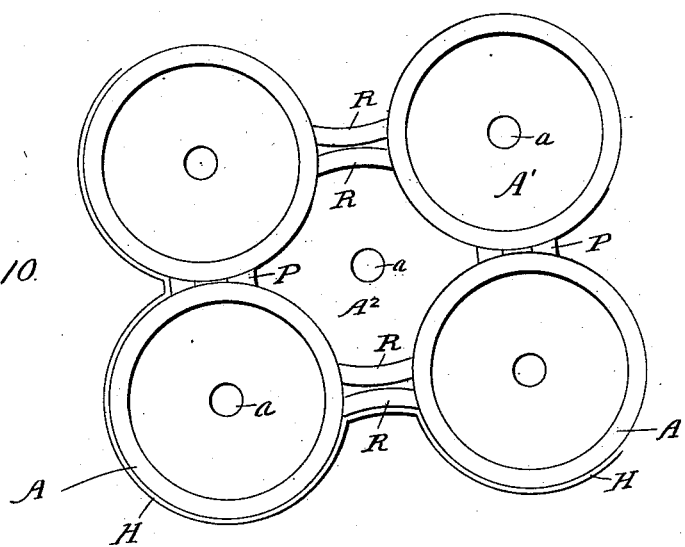
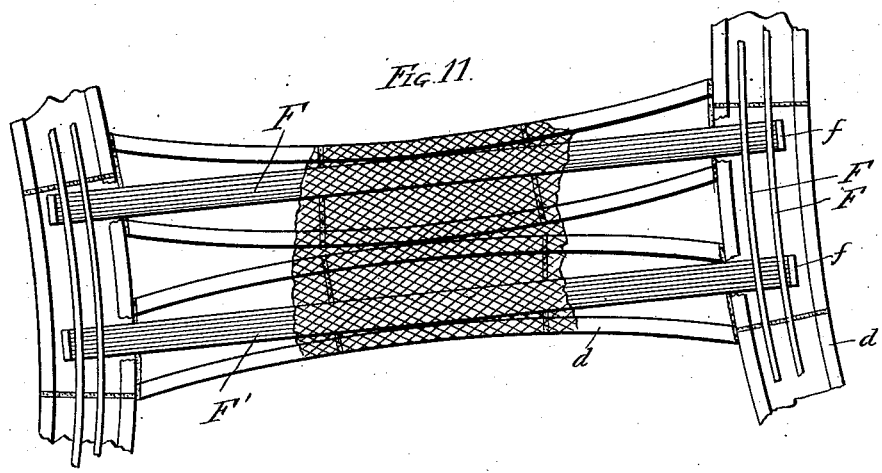
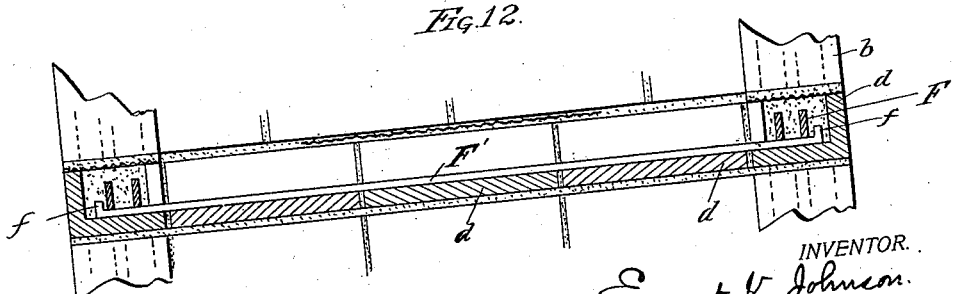
WITNESSES:  
F. B. Townsend  
H. W. Munday  
INVENTOR.  
Ernest V. Johnson  
BY Munday, Evarts & Adcock  
ATTORNEYS

UNITED STATES PATENT OFFICE.

ERNEST V. JOHNSON, OF CHICAGO, ILLINOIS.

FIREPROOF GRAIN-BIN.

SPECIFICATION forming part of Letters Patent No. 713,104, dated November 11, 1902.

Application filed June 14, 1902. Serial No. 111,599. (No model.)

*To all whom it may concern:*

Be it known that I, ERNEST V. JOHNSON, a citizen of the United States, residing in Chicago, in the county of Cook and State of Illinois, have invented a new and useful Improvement in Fireproof Grain Bins or Elevators, of which the following is a specification.

My invention relates to the construction of fireproof grain bins or elevators the walls of which are required to withstand great outward or bulging pressure, as well as great weight or crushing force from the grain or like material confined therein, and which in practice are required to be of large capacity and of great height.

The object of my invention is to provide a fireproof grain bin or elevator of a simple, efficient, strong, and durable construction that not only will successfully withstand the great outward bulging and crushing strains due to the enormous weight of the great mass of grain stored therein, but which will also operate to practically and successfully exclude moisture and the penetrating force of fierce driving storms of rain beating against the walls, so that the grain stored therein may be preserved perfectly dry, as required, to prevent its musting or spoiling.

My invention consists in the novel construction of parts and devices and in the novel combinations of parts and devices herein shown and described and by which this object or result is accomplished.

Figure 8:
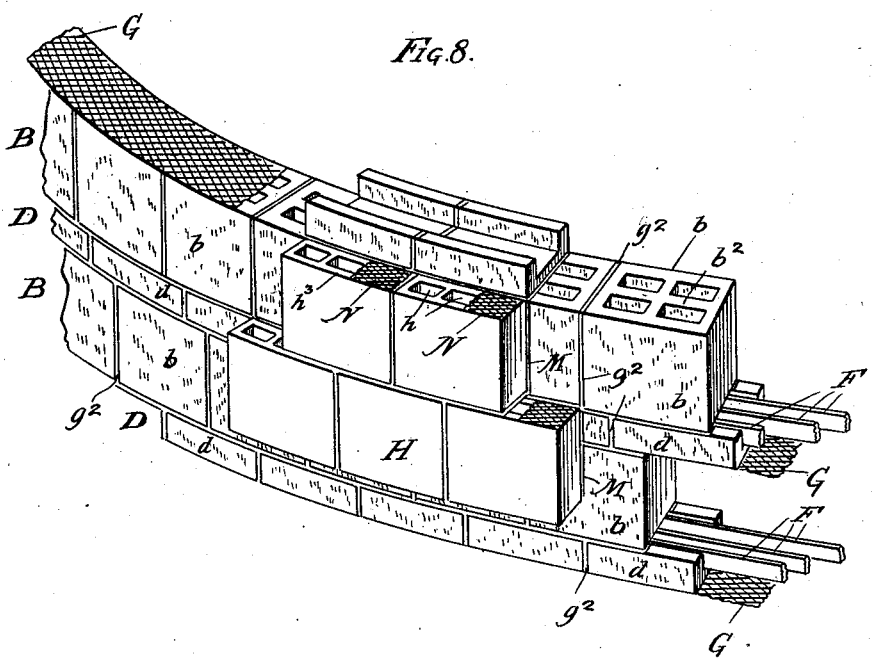
Figure 9:
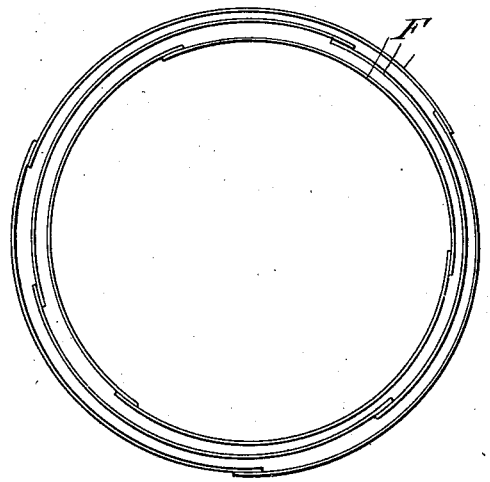

In the accompanying drawings, forming a part of this specification, Figure 1 is a plan view of a grain bin or elevator embodying my invention. Fig. 2 is an enlarged detail plan view of a portion of the walls, showing different courses in part removed. Fig. 3 is a detail vertical section on line 3 3 of Fig. 2. Fig. 4 is a detail plan view showing different courses of the wall. Fig. 5 is a vertical section showing some of the tiles in section and others in elevation. Fig. 6 is a detail vertical section through the facing-tiles. Fig. 7 is a detail perspective view of one of the facing-tiles. Fig. 8 is a detail perspective view of a portion of the wall, showing the courses in part removed. Fig. 9 is a detail plan view showing the tensile-acting metal members or bands, their thickness and distance apart, however, being much exaggerated. Fig. 10 illustrates a modification. Fig. 11 represents an enlarged detail plan, and Fig. 12 a section on line 12 12 of Fig. 11.

In the drawings like letters of reference indicate like parts in all the figures.

In the drawings, A represents a cylindrical fireproof grain-bin, the same being, as I ordinarily construct them, about twenty-one feet in diameter and eighty feet in height and provided with a hopper-shaped bottom $A'$ and having a central discharge $a$. The cylindrical wall of the bin is composed in part of courses B of hollow tiles $b$, each having preferably four hollows or open spaces $b'$ therein extending vertically, so that the webs $b^2$ of the tiles extend upright or in the direction of the crushing strain or weight exerted upon and resisted by the wall. The cylindrical wall is composed in part of courses D of horizontally-arranged channel-tiles $d$, the troughs $d'$ of which extend horizontally and circumferentially of the wall and form continuous annular channels to receive the tensile-acting metal members F F, preferably consisting of steel bands placed edgewise and parallel to each other in the troughs of the channel-tiles and embedded in the cement or mortar or grouting C, which fills the troughs of the channel-tiles. As it is inconvenient to obtain and apply the metal members or bands F in one continuous piece, the same are preferably composed of a number of separate strips, each about one-fourth inch in thickness and two inches in width and lapped at their meeting ends for a distance of about four feet. As these metal members or bands are embedded throughout their length in the cement or mortar C, the same are, in fact, anchored to the wall each throughout its entire length or at every point of its length. To insure the proper bedding of the tiles $b$ in the cement or mortar forming the horizontal joints $g$ and the production of perfect joints $g$ between the bottoms of the channel-tiles $d$ and the tops of the tiles $b$, I interpose metal fabric strips G, preferably woven wire, between said tiles $b$ $d$. The strips $g$ of thin open material or woven wire serve to retain the mortar or cement and insure the production of perfect joints $g$ between the tiles $b$ $d$ and prevent any crevices or imperfections which might otherwise result from the narrowness of the webs $b^2$ of the tiles $b$, which abut against the tiles $d$. The joint $g'$ between the lower ends of the tiles $b$ and the upper faces of the channel-tiles $d$ are made complete and perfect by reason of the channel-tiles $d$ being filled with cement or mortar C, and thus do not require the open metal fabric G. The vertical joints $g^2$ between the tiles $b$ $b$ are formed between broad flat faces of the tiles and no difficulty is here experienced.

M is a layer of cement or mortar on the exterior periphery or face of the tiles $b$ $d$ and forming a waterproof joint between the outer faces of the tiles $b$ $d$ and the inner faces of the exterior facing-tiles H, which facing-tiles H break joints vertically with the tiles $b$ and the tiles $d$ and also break joints horizontally with said tiles $b$ $d$ except at, for example, each fifth horizontal joint between the tiles $b$ $d$, as will be readily understood from Fig. 5, at which fifth horizontal joint a metal fabric clip N is inserted in the horizontal joint to bind the facing-tiles to the main portion of the walls. The facing-tiles H are preferably furnished with three hollows or open spaces $h$, which, however, are closed at their upper ends by cement plugs $h'$, which serve not only to make the horizontal joints $h^2$ between the facing-tiles perfect, but also to prevent any rain or moisture that may be driven through the outer web $h^3$ of the facing-tiles or which may enter through a horizontal joint from flowing down the interior of the facing-tiles, and thus collecting in a body or column and forcing its way through the tiles $b$ $d$.

In practice a number of cylindrical grain-bins are ordinarily arranged tangent to each other in a group, as illustrated in Fig. 1, the exterior facing-tiles H, however, only surrounding the exterior portion of each cylindrical bin A. Tangent tiles P are inserted in the interstices between the cylindrical bins A, the same having curved faces $p$ and hollows or open spaces $p'$ $p'$; and steel clips O, having depending lips O', embracing the interior bands F of each cylindrical bin-wall, are also applied, as illustrated in Figs. 2 and 3, to more securely bind the walls of the two cylindrical bins together; and at their tangent or meeting points the walls of the two contiguous cylindrical bins are also further connected by extending a single metal fabric strip G' through both walls, as will be readily understood from Figs. 2 and 3. The joint or contact between the two walls of two contiguous cylindrical bins represented by the distance between the outer ends of the tangent tiles P P is preferably about four feet. The space thus thus formed between four contiguous cylindrical bins A A A forms an interstice bin $A^2$, which may be furnished with a hopper bottom A' and outlet $a$ and filled with grain. The tiles $b$, $d$, and H are all preferably curved in shape to correspond to the curvature of the wall.

In the modification illustrated in Figs. 10, 11, and 12 in order to increase the size of the interstice bin $A^2$ a pair of segmental walls R R are formed, uniting two pair of the cylindrical bins A A. The segmental walls R R are similar in construction to the cylindrical walls before described and composed of hollow tiles $b$ and channel-tiles $d$, and steel bar-clips F', having shoulders $f$, are laid in the bottom of the channel-tiles and embrace the bands F F in the walls of the cylindrical bins A A to more securely bind the cylindrical bins together and to strengthen the segmental walls R R.

I claim—

1. A group or series of fireproof cylindrical grain-bins A A, arranged tangent to each other and connected together by tangent tiles, walls and metal clips or anchors bridging the tangent tiles, and having each its cylindrical wall composed of courses of vertically-arranged hollow tiles, and courses of horizontally-arranged channel-tiles forming continuous annular channels, tensile-acting metal members or bands in the channels, cement or mortar filling such annular channels and in which the tensile-acting metal members or bands are embedded throughout their length, and exterior facing-tiles breaking joints with said hollow tiles and channel-tiles, and having a waterproof facing between said facing-tiles and said hollow tiles and channel-tiles, the horizontal joints between the bottom faces of the channel-tiles and the upper ends of the hollow tiles having strips of metal fabric therein, substantially as specified.

2. A fireproof cylindrical grain-bin, having its cylindrical wall composed of courses of vertically-arranged hollow tiles and courses of horizontally-arranged channel-tiles, forming annular channels, tensile-acting metal members in said annular channels, cement or mortar filling such annular channels in which the metal bands are embedded throughout their length, exterior facing-tiles, and a waterproof cement-mortar facing between the facing-tiles and said channel and hollow tiles, substantially as specified.

3. A fireproof cylindrical grain-bin, having its cylindrical wall composed of courses of vertically-arranged hollow tiles $b$, and courses of horizontally-arranged channel-tiles $d$ forming annular channels, metal bands F therein, cement or mortar C in said channels, exterior facing-tiles H breaking joints with said tiles $b$, $d$, and metal fabric G interposed in the horizontal joints between said tiles $b$ and the lower faces of said tiles $d$, substantially as specified.

4. A fireproof cylindrical grain-bin, having its cylindrical wall composed of courses of vertically-arranged hollow tiles $b$, courses of horizontally-arranged channel-tiles $d$, metal bands F in said channels, cement or mortar in said channels embedding said bands, exterior facing-tiles H having their hollow or open spaces vertically arranged and closed at one end, substantially as specified.

5. A fireproof cylindrical grain-bin having its cylindrical wall composed of courses of vertically-arranged hollow tiles $b$ and courses of horizontally-arranged channel-tiles $d$, metal bands F in said channels, cement or mortar C in said channels embedding said bands, exterior facing-tiles H, waterproof cement-mortar facing M between said tiles $b, d$, and said tiles H, and metal clips N extending at intervals in the horizontal joints of said tiles H, H and $b, d$, substantially as specified.

6. A group of fireproof cylindrical grain-bins A A, having each its cylindrical wall composed of courses of vertically-arranged hollow tiles $b$, channel-tiles $d$, metal bands F, cement or mortar C filling said channels and embedding said bands, tangent tiles P, P uniting the walls of contiguous bins, and exterior facing-tiles H surrounding the exterior portions of the walls of said cylindrical bins A, substantially as specified.

7. A group of fireproof cylindrical grain-bins A A, having each its cylindrical wall composed of courses of vertically-arranged hollow tiles $b$, channel-tiles $d$, metal bands F, cement or mortar C filling said channels and embedding said bands, tangent tiles P, P uniting the walls of contiguous bins, exterior facing-tiles H surrounding the exterior portions of the walls of said cylindrical bins, and metal clips O bridging said tangent tiles P, substantially as specified.

8. A fireproof cylindrical grain-bin having its cylindrical wall composed of courses of vertically-arranged hollow tiles $b$, courses of channel-tiles $d$, metal bands F, cement mortar C filling said channel and embedding said bands, strips of metal fabric G in the horizontal joints between said tiles $b, d$, and facing-tiles H breaking joints with said tiles $b, d$ both horizontally and vertically, and a waterproof joint or facing M between said tiles H and said tiles $b, d$, substantially as specified.

ERNEST V. JOHNSON.

Witnesses:
H. M. MUNDAY,
L. LINDAUER.